3,251,660
COMPOSITE ELECTRICALLY CONDUCTIVE
SPRING MATERIALS
Norman J. Finsterwalder, Plainville, Mass., assignor to Texas Instruments Incorporated, Dallas, Tex., a corporation of Delaware
Filed June 13, 1962, Ser. No. 202,232
6 Claims. (Cl. 29—196.3)

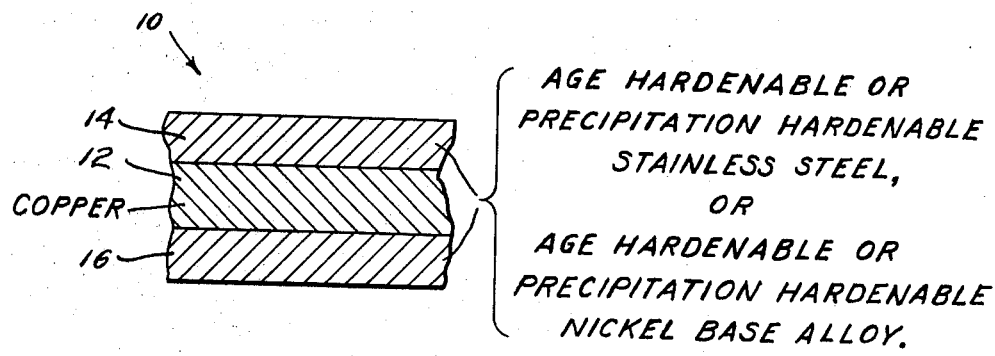

This invention relates to new and improved composite metals and with regard to certain more specific features to new and improved electrically conductive composite spring materials.

Among the several objects of the invention may be noted the provision of new and improved composite electrically conductive spring materials useful for spring components in such devices as fuseclips, electrical connectors, rheostats, thermostats and other purposes; the provision of such materials which are low-cost and possess required ductility for extreme forming; the provision of such materials which have good corrosion and oxidation resistance and which afford the combined advantages of good spring characteristics, as well as high electrical conductivity; the provision of such materials which will retain substantially all of its operating characteristics when subjected to elevated temperatures in service, for example, up to 700° F.; and the provision of such materials which provide good weldable surfaces to facilitate electrical connection and mounting of components made therefrom.

Other objects and features will be in part apparent and in part pointed out hereinafter.

The invention accordingly comprises the elements and combinations of elements, ingredients and combinations of ingredients, features of construction, composition and arrangement of parts which will be exemplified in the construction and products hereinafter described, and the scope of which will be indicated in the following claims.

In the accompanying drawing is shown an enlarged diagrammatic cross section of a bonded material according to the present invention.

Dimensions of certain of the parts as shown in the drawing may have been modified and/or exaggerated for the purposes of clarity of illustration.

Referring now to the drawing, there is shown at numeral 10 a three layered composite material according to the invention. Material 10 comprises a centrally located copper layer 12 sandwiched between and metallurgically bonded to a pair of exposed layers 14 and 16. Layers 14 and 16 are formed of an age hardenable or precipitation hardenable stainless steel or of an age hardenable or precipitation hardenable nickel base alloy such as a high nickel-chromium-iron alloy sold under the trademark Inconel X, an alloy having the approximate composition by percentage weight of 0.08% (max.) carbon; 1.00% (max.) maganese; 0.5% (max.) silicon; 14.0% to 17.0% chromium; 70.0% (min.) nickel; 0.40% to 1.00% aluminum; 0.70% to 1.20% columbium; 2.25% to 2.75% titanium and 5.00% to 9.00% iron. Suitable age hardenable stainless steel alloys are (1) an alloy sold under the trade name "Armco PH15-7Mo," having the approximate percentage weight composition of 0.09% (max.) carbon; 1.00% (max.) manganese; 1.00% (max.) silicon; 14.00% to 16.00% chromium; 6.50% to 7.75% nickel; 2.00% to 3.00% molybdenum; and 0.75% to 1.50% aluminum and (2) an alloy sold under the trade name "Armco 17-7PH," having the approximate percentage weight composition of 0.09% (max.) carbon; 1.00% (max.) manganese; 1.00% (max.) silicon; 16.00% to 18.00% chromium; 6.50% to 7.75% nickel and 0.75% to 1.50% aluminum.

Each of layers 12, 14, 16, are solid-phase bonded to each other. The term "solid-phase bonding" means bonding under pressure according to methods described, for example, in U.S. Patent Nos. 2,691,815 and 2,753,623, according to which no liquid phase occurs during the bonding process.

By way of example, material 10 may range in thickness from 0.003 to 0.070 inch. Material 10 may be of any desired width, a suitable example being 6 inches.

For optimum results, it is preferred that the composite material 10 have a relative layer thickness ratio (expressed in terms of percent of over-all composite thickness) as follows:

| | Percent |
|---|---|
| Steel layer 14 | 25–37½ |
| Copper layer 12 | 25–50 |
| Steel layer 16 | 25–37½ |

A typical nominal ratio expressed in percent of composite thickness within this optimum range, for the steel layer 14, copper layer 12, steel layer 16, respectively, is 30%–40%–30%.

Among the important characteristics and advantages of material 10 may be noted its high strength and electrical conductivity at elevated temperatures as high as 700° F. (1000° F. when layers 14 and 16 are formed of Inconel X). Material 10 has a substantially lower density, a higher modulus of elasticity, and greater fatigue strength than that generally available in commonly used nonferrous type electrically conductive spring materials and also because of the lower density of material 10, more parts per pound can be fabricated, thus presenting a material savings which in many cases is substantial. Advantageously, material 10 can be annealed, heat treated, resistance spot welded, formed, sheared, or bent for fabrication substantially without damage to the solid-phase bond between the layers. Material 10 advantageously combines the strength and the spring characteristics of the steel components 14 and 16 with the comparatively high electrical conductivity of the copper component 12. The outer steel layers provide a corrosion resistant surface, and a good weldable surface for effecting low resistance electrical connections thereto. Layers 14, 12 and 16 of material 10 are substantially symmetrical in cross section with the relatively thick, comparatively weaker copper component 12, centrally located which gives the advantage of eliminating or at least minimizing thermal deflection when material 10 is subjected to elevated temperature. While the relatively soft copper layer 12 is comparatively thick, it has been found that its influence on the elastic behavior of the composite 10 is relatively minor which is believed due to its central location within the composite material, i.e., at the neutral axis region of lowest stress under loading conditions in bending.

Table I below provides comparision of some representative properties and characteristics (with typical values) between material 10 and typical examples of conventional nonferrous electrically conductive spring materials.

TABLE I

| | Material 10—Age Hardenable Stainless Steel Clad Copper | | | Beryllium-Cu* #10 Alloy [8] | Be-Copper** #25 Alloy [8] |
|---|---|---|---|---|---|
| Condition | 3 No. Hard and Aged [2] | 4 No. Hard and Aged [2] | Annealed and Heat Treated [3] | Mill Hardened | Annealed and Heat Treated |
| Yield Strength in Bending, p.s.i.×$10^3$ [1] | 190 | 215 | 175 | 86 | 140 |
| Yield Strength .2% Offset (tensile), p.s.i.×$10^3$ | 115 | 140 | 123 | | 130–150 |
| Ultimate Strength (tensile), p.s.i.×$10^3$ | 135 | 155 | 128 | 120 | 165–180 |
| Elongation (tensile), percent in 2″ | 4 | 2.5 | 6 | 3–8 | 4–10 |
| Hardness, D.P.H | 450 | 500 | 450 | 220–270 | 350–400 |
| Fatigue-Strength,[5] p.s.i.×$10^3$ | | 59 | | 35 | 35–45 |
| Modulus of Elasticity, p.s.i.×$10^6$ | [4] 25.4 | [4] 25.4 | [4] 25.4 | 18.5 | 19.0 |
| Resistivity, Ohms Per Cir. Mil. Ft | 25–34 | 25–34 | 25–34 | 21 | 34–47 |
| Electrical Conductivity, percent I.A.C.S | 30–40 | 30–40 | 30–40 | 48 | 22–30 |
| Thermal Conductivity, B.t.u./Sq. Ft./in./hr./°F | [6] 180–990 | [6] 180–990 | [6] 180–990 | 1,450–1,800 | 750–900 |
| Thermal Expansion Coefficient, 68–212F in./in./°F | [7] 7.0×$10^{-6}$ | [7] 7.0×$10^{-6}$ | [7] 7.0×$10^{-6}$ | 9.8×$10^{-6}$ | 9.3×$10^{-6}$ |
| Density, lb./cu. in. | [7] .298 | [7] .298 | [7] .298 | .316 | .298 |
| Maximum Service Temp., °F | about 650 | about 650 | about 650 | about 400 | about 300 |

[1] Determined under loading in bending. Yield criterion in bending is based on a specific change in slope of the stress-strain curve. Yield strength is the unit stress at which the stress to strain ratio has decreased to ¾ of the linear stress to strain ratio.
[2] Aged at 900F—1 hr.
[3] 1,400F—1½ hrs. cooled to 60F Max., reheated 1,050F 1½ hrs.
[4] Measured in bending.
[5] For $10^7$ cycles-strip in reverse bending.
[6] Computed—lower value normal to surface; higher parallel.
[7] Computed.
[8] Properties, other than yield strength in bending, taken from manufacturers' literature.
*Be Cu #10 is an alloy having the nominal composition of approximately 0.5% beryllium, 2.5% cobalt and remainder copper.
**Be Cu #25 is an alloy having the nominal composition of approximately 2.00% beryllium, 0.3% cobalt and remainder copper.

Material 10 can be age hardened by heat treatment by any one of various suitable methods. Material 10 should be clean and free from oil, grease and foreign matter before heat treatment, as such conditions may result in undue discoloration and harm to mechanical and corrosion resistance properties.

When the annealed condition, material 10 can be suitably age hardened by one of the following two alternative methods.

Method 1

First heat the material to 1400° F. ±25° F. and hold the material at this temperature for 1½ hours.

Then cool the material to 60° F. maximum within 1 hour and hold the material at this temperature for ½ hour.

Then heat the material to 1050° F. ±10° F. and hold the material at this temperature for 1½ hours. Then air cool.

Method 2

First heat the material to 1750° F. ±15° F. and hold the material at this temperature for 10 minutes. Then air cool the material.

Then cool the material to −100° F. ±10° F. in a subzero cooler and hold the material at this temperature for 8 hours.

Then heat the material to 950° F. ±10° F. and hold the material at this temperature for 1 hour. Then air cool the material.

The most important factors in heat treatment are atmosphere, temperature control, and type of furnace employed. In general, oil and gas fired units, where the combustion products come in contact with the material, are not satisfactory. The use of an electric or radiant tube type furnace, with a hydrogen or inert gas atmosphere is preferred.

At the 1400° F. and lower temperatures, discoloration of the material is difficult to avoid even under careful control of all conditions. Where freedom from discoloration is required, best results can often be achieved with a vacuum furnace.

Material 10 in the cold-rolled condition, can be age hardened by a simple treatment by heating the material to a temperature of 900° F. for 1 hour. No protective atmosphere is necessary unless the slight discoloration which occurs at this temperature is objectionable.

The following examples illustrate the invention:

EXAMPLE 1

A three-layered composite material such as shown in the drawing was bonded with the layers having the following final thickness ratios (based on percentage of the overall composite thickness):

| | Percent |
|---|---|
| Steel layer 14 | 25 |
| Copper layer 12 | 50 |
| Steel layer 16 | 25 |

Two continuous steel strips, 2″ wide each having a starting thickness of 0.030 inch, and a 2″ wide centrally located continuous O.F.H.C. (oxygen free, high conductivity) copper strip having a starting thickness of 0.052 inch were used. The steel layers were formed of an Armco PH15–7Mo alloy.

These layers were cleaned on their surfaces to be bonded in the manner described in the Boessenkool et al. Patent 2,691,815 mentioned above. All three layers were then assembled and bonded simultaneously in line, by roll squeezing the composite to a reduced over-all composite thickness of approximately 0.050 inch. The green bonded composite was then annealed to perfect the bond. This annealing step was performed in a furnace at a temperature of 1850° F. Then the composite strip was edge trimmed and rolled to a finished gauge of 0.025 inch. The finish gauge rolling was accomplished with a plurality of alternate rolling and intermediate annealing steps. The annealing steps were performed at a temperature of 1850° F.

EXAMPLE 2

A material like that shown in the drawing was bonded with the layers having the following final thickness ratios (based on percentage of over-all composite thickness):

| | Percent |
|---|---|
| Steel layer 16 | 30 |
| Copper layer 12 | 40 |
| Steel layer 14 | 30 |

The steel layers were the same materials as that in Example 1 but were 6 inches wide and had the starting thickness of 0.032″. The copper strip was 6 inches wide and had a starting thickness of 0.046 inch. The strips were bonded in the manner described in Example 1 to a bonded thickness of 0.046 inch. The composite was then strip annealed at a temperature of 1850° F., edge trimmed and rolled to a finish gauge of 0.025".

EXAMPLE 3

A material like that shown in the drawing was bonded with the layers having the following final thickness ratios (based on percentage of over-all composite thickness):

|   | Percent |
|---|---|
| Outer layer 16 | 30 |
| Copper layer 12 | 40 |
| Outer layer 14 | 30 |

The outer layers 14 and 16 were Inconel X, were 2 inches wide and each had a starting thickness of 0.030 inch. The copper strip was 2 inches wide and had a starting thickness of 0.040 inch. The strips were bonded as described in Example 1 to a bonded thickness of 0.040 inch. Then by a plurality of alternate rolling and annealing steps the bonded composite was reduced to a final gauge of 0.015 inch. The annealing steps were performed at a temperature of 1850° F.

EXAMPLE 4

This is the same Example 1 except that an age hardenable zirconium-copper alloy having a nominal composition by percent weight of approximately 0.12% zirconium and the remainder copper was used instead of the O.F.H.C. copper strip of Example 1.

The copper strip had a starting thickness of 0.060 inch and was 2 inches wide. The steel strips were Armco PH15–7Mo alloy and 2 inches wide and each had a starting thickness of 0.030 inch. The strips were bonded in the manner described in Example 1 to a bonded thickness of about 0.048 inch. The composite was then further rolled and reduced to a finish gauge of 0.015 inch. Intermediate anneals were performed at 1850° F.

It will be seen that the several objects of the invention are achieved and that other advantageous results are obtained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. Electrically conductive spring material comprising a plurality of metallurgically bonded metallic layers including a centrally located, comparatively thick copper alloy having the approximate percentage by weight composition of 0.12% zirconium and the remainder copper sandwiched between a pair of layers formed of an age hardenable stainless steel alloy having the approximate percentage by weight composition of 0.09% (max.) carbon; 1.00% (max.) manganese; 1.00% (max.) silicon; 14.00% to 16.00% chromium; 6.50% to 7.75% nickel; 2.00% to 3.00% molybdenum; and 0.75% to 1.50% aluminum, each of said layers of said material being substantially symmetrical in cross section.

2. The material as set forth in claim 1 and wherein each of said steel layers comprise approximately 25% to 37½% of the over-all thickness of the composite material, and said copper alloy layer comprises 25% to 50% of the over-all thickness of the composite material.

3. Electrically conductive spring material comprising a plurality of metallurgically bonded metallic layers including a centrally located, comparatively thick copper alloy having the approximate percentage by weight composition of 0.12% zirconium and the remainder copper sandwiched between a pair of layers formed of an age hardenable stainless steel alloy having the approximate percentage by weight composition of 0.09% (max.) carbon; 1.00% (max.) manganese; 1.00% (max.) silicon; 16.00% to 18.00% chromium; 6.50% to 7.75% nickel; and 0.75% to 1.50% aluminum, each of said layers of said material being substantially symmetrical in cross section.

4. The material as set forth in claim 3 and wherein each of said steel layers comprise approximately 25% to 37½% of the over-all thickness of the composite material, and said copper alloy layer comprises 25% to 50% of the over-all thickness of the composite material.

5. Electrically conductive spring material comprising a plurality of metallurgically bonded metallic layers including a centrally located comparatively thick copper alloy layer having an approximate percentage by weight composition of 0.12% zirconium and the remainder copper sandwiched between a pair of layers, each formed of an age hardenable nickel base alloy having an approximate percentage by weight composition of 0.08% (max.) carbon; 1.00% (max.) manganese; 0.5% (max.) silicon; 14.00% to 17.00% chromium; 70.00% (min.) nickel; 0.40% to 1.00% aluminum; 0.70% to 1.20% columbium; 2.25% to 2.75% titanium; and 5.00% to 9.00% iron, each of said layers of said material being substantially symmetrical in cross section.

6. The material as set forth in claim 5 and wherein each of said age hardenable nickel base alloy layers comprise approximately 25% to 37½% of the over-all thickness of the composite material, and said copper alloy layer comprises 25% to 50% of the overall thickness of the composite material.

References Cited by the Examiner

UNITED STATES PATENTS

| 2,053,096 | 9/1936 | McKay | 29—196.3 X |
| 2,325,659 | 8/1943 | Chace | 29—183.5 |
| 2,505,762 | 5/1950 | Goller | 75—153 |
| 2,558,093 | 6/1951 | Kinney | 29—196.3 X |
| 2,691,815 | 10/1954 | Boessenkool. | |
| 2,718,690 | 9/1955 | Ulam | 29—196.3 X |
| 2,847,303 | 8/1958 | Pruna | 75—153 |
| 2,879,191 | 3/1959 | Nippert | 75—153 X |

DAVID L. RECK, *Primary Examiner.*

HYLAND BIZOT, *Examiner.*